United States Patent [19]
Bai et al.

[11] Patent Number: 5,744,258
[45] Date of Patent: Apr. 28, 1998

[54] HIGH POWER, HIGH ENERGY, HYBRID ELECTRODE AND ELECTRICAL ENERGY STORAGE DEVICE MADE THEREFROM

[75] Inventors: Lijun Bai; Changming Li, both of Vernon Hills, Ill.; Anaba A. Anani; George Thomas, both of Lawrenceville, Ga.; Han Wu, Barrington; Ke Keryn Lian, Palatine, both of Ill.; Frank R. Denton, III; Jason N. Howard, both of Lawrenceville, Ga.

[73] Assignee: Motorola, Inc., Schaumburg, Ill.

[21] Appl. No.: 774,048

[22] Filed: Dec. 23, 1996

[51] Int. Cl.$^6$ .................................................. H01M 4/36
[52] U.S. Cl. ........................ 429/3; 429/209; 429/213; 429/218; 429/219
[58] Field of Search .......................... 429/9, 209, 219, 429/213, 218, 3

[56] References Cited

U.S. PATENT DOCUMENTS

| | | | |
|---|---|---|---|
| 3,520,729 | 7/1970 | Voss et al. | 429/219 |
| 4,324,828 | 4/1982 | Ebato et al. | 429/209 |
| 5,439,756 | 8/1995 | Anani et al. | 429/9 |
| 5,571,636 | 11/1996 | Ohta et al. | 429/219 X |
| 5,670,276 | 9/1997 | Takeuchi et al. | 429/219 |

*Primary Examiner*—Stephen Kalafut
*Attorney, Agent, or Firm*—Dale Dorinski; Felipe J. Farley; Kelly A. Gardner

[57] ABSTRACT

A hybrid electrode for a high power, high energy, electrical storage device contains both a high-energy electrode material (42) and a high-rate electrode material (44). The two materials are deposited on a current collector (40), and the electrode is used to make an energy storage device that exhibits both the high-rate capability of a capacitor and the high energy capability of a battery. The two materials can be co-deposited on the current collector in a variety of ways, either in superimposed layers, adjacent layers, intermixed with each other or one material coating the other to form a mixture that is then deposited on the current collector.

18 Claims, 5 Drawing Sheets

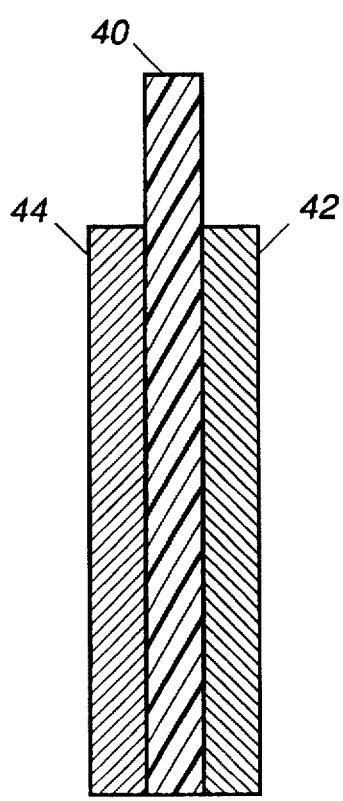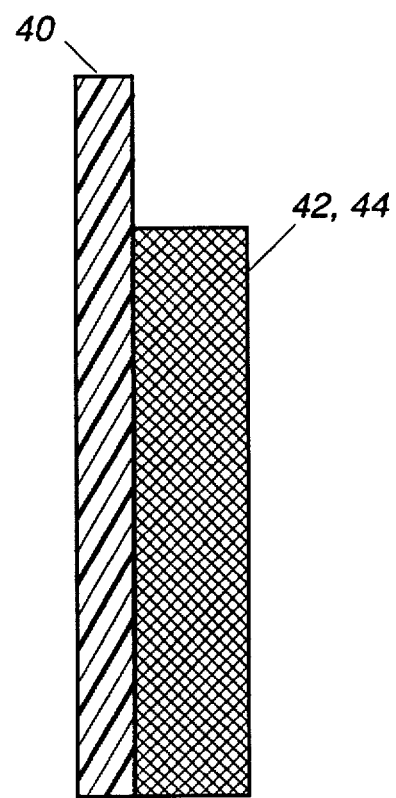
FIG. 2  FIG. 3

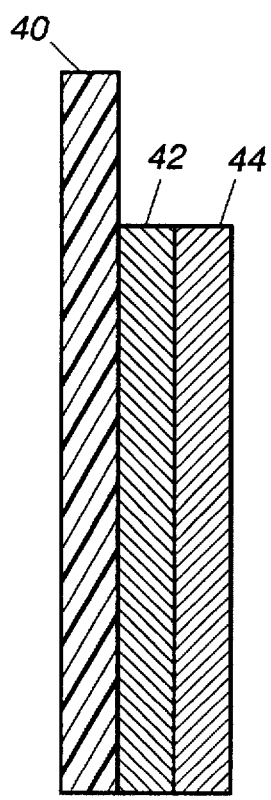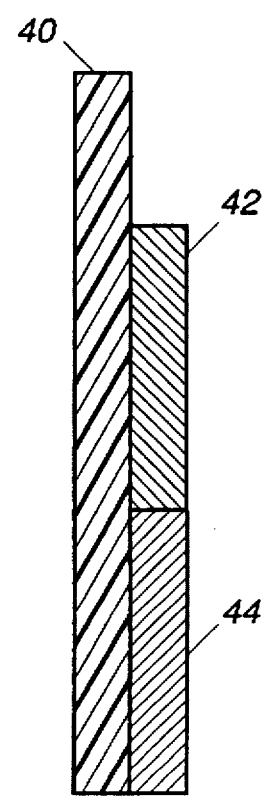
*FIG. 4*  *FIG. 5*

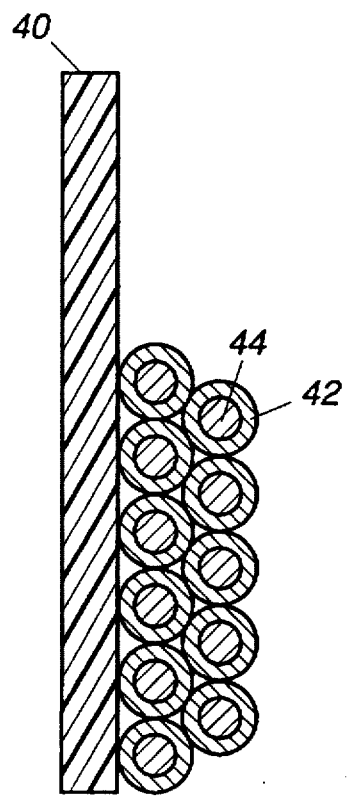
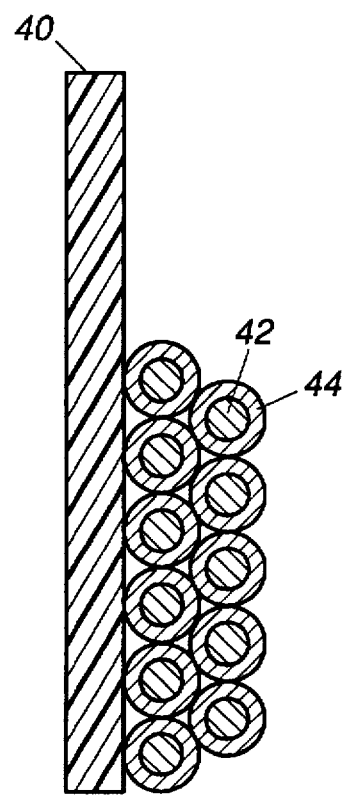
FIG. 6     FIG. 7

5,744,258

HIGH POWER, HIGH ENERGY, HYBRID ELECTRODE AND ELECTRICAL ENERGY STORAGE DEVICE MADE THEREFROM

TECHNICAL FIELD

This invention relates in general to electrodes for energy storage devices, and more particularly, to a hybrid electrode providing the characteristics of a capacitor and the characteristics of a battery in a single electrode, and to an energy storage device made with the hybrid electrode.

BACKGROUND OF THE INVENTION

Energy generation and storage in portable packages has long been a subject of study and development. Storage of electrical energy in a compact form that can be readily charged and discharged such as rechargeable electrochemical batteries and/or electrochemical capacitors is of special importance. High power, high energy, rechargeable energy storage devices are necessary to power devices that have a wide range of electrical requirements. Examples of such devices include digital communication devices, power tools, and portable computers to name but a few. In each of these devices, the instantaneous high power that can be provided by a capacitor is occasionally needed, while the high energy that can be provided by a battery is required at other times. Lithium ion technology offers enhanced energy capability but generally at the expense of maximum power. Another prior art solution has been to combine an electrochemical capacitor in parallel with a battery to meet the peak power requirements of pulsed power applications. This architecture can significantly enhance battery performance in terms of talk time, low-temperature performance, and/or cycle-life. Unfortunately, it requires incorporation of a separate component, i.e. the electrochemical capacitor, within the battery pack. This additional component adds to the volume and the complexity of the energy storage device, and thus is not the most desirable solution.

Accordingly, there exists a need to provide a novel electrochemical device that meets the needs of modern cordless pulsed power devices in a small package, without the complexity associated with prior art solutions.

BRIEF DESCRIPTION OF THE DRAWINGS

FIGS. 2–7 are schematic cross-sectional representations of embodiments of a hybrid electrode in accordance with the invention.

DETAILED DESCRIPTION OF THE PREFERRED EMBODIMENT

Figure 1:
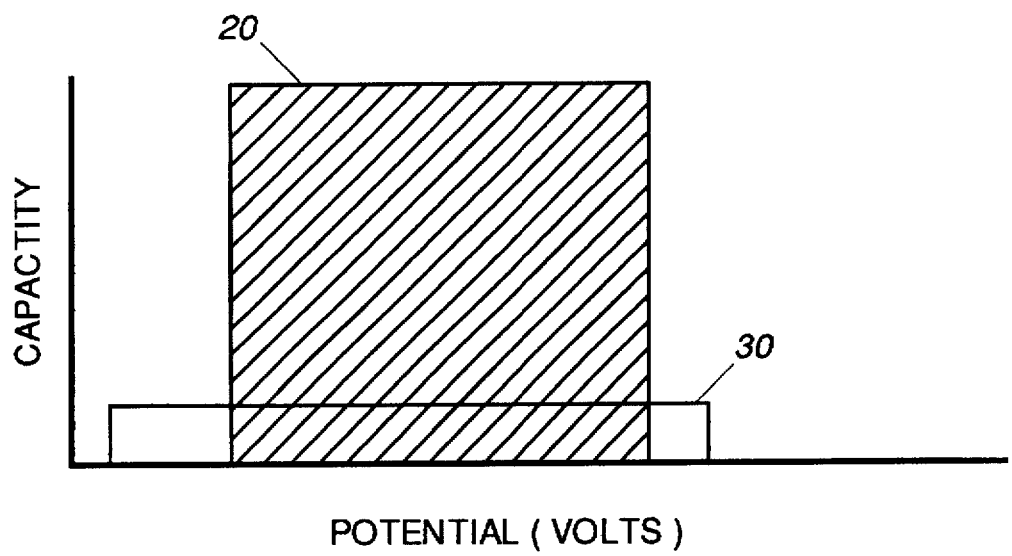
FIG. 1 is a graph displaying the interrelationship between high-rate and high-energy materials in accordance with the invention.

While the specification concludes with claims defining the features of the invention that are regarded as novel, it is believed that the invention will be better understood from a consideration of the following description in conjunction with the drawing figures.

It is desirable to fabricate the hybrid system at the materials level and to incorporate the energy storage system within a single device. "Batteries" and the materials used for their electrodes are well known to be high in energy density, while "capacitors" and the materials used in their electrodes are well known to be high in peak power density or rate capability. To aid in describing and understanding the invention, electrode materials that generally exhibit the characteristics of a battery will be referred to herein as "high-energy" materials, while electrode materials that generally exhibit the characteristics of capacitors will be referred to herein as "high-rate" materials. Examples of some popular "high-energy" materials that have been used as anodes in rechargeable aqueous batteries include cadmium, metal hydrides, lead and zinc, while cathodes have been fabricated from nickel oxide, lead oxide, silver, and oxygen or air (with catalyst). Examples of "high-energy" anode materials for Li-ion rechargeable batteries include carbon (Li-intercalating), $WO_3$, and $TiS_2$, and SnOx, with corresponding cathode materials such as $Li_xNi_yO_z$, $LiCoO_2$, $LiMn_2O_2$ and $LiV_6O_{13}$, and where x, y and z vary between 0.1 and 10. Other candidate "high-energy" materials include La, Li, Na, Al, Fe, Zn, Cd, Pb, Sn, Bi, C, V, Mn, Co, Ni, Ag and their oxides, hydroxides, hydrides, carbides, nitride or sulfites, and polyaniline, polythiophene, polyfluorophenylthiopene, polypyrolle, n-or p-doped polymers, redox polymers, and mixtures thereof. Examples of some "high-rate" materials that have been used in capacitors include high-surface area carbon (variously known as activated carbon, carbon black, amorphous carbon, etc.), ruthenium oxide, silver oxide, cobalt oxide, and conducting polymers (such as polyaniline, polythiophene, polyfluorophenylthiopene, n-Mor p-doped polymers, redox polymers, or polypyrolle). Other candidate "high-rate" materials include C, Nb, Hf, Ti, Ta, Li, Fe, Zn, Sn, Ru, Ag, Pt, Ir, Pb, Mo, W, Ni, Co and their oxides, hydroxides, hydrides, carbides, nitride or sulfites, and mixtures thereof.

By combining these materials onto the same current collector, an electrical energy storage device can be assembled with an anode, cathode, and electrolyte which will provide the high energy of a battery and high power of a capacitor, without the undue complexity shown in the prior art. Our 'hybrid' electrode for a high power, high energy, electrical storage device contains both a high-energy material and a high-rate material. The two materials are deposited on a current collector to form a single 'hybrid' electrode, and this electrode is then used to make an electrical energy storage device that exhibits both the high-rate capability of a capacitor and the high energy capability of a battery. The two materials can be co-deposited on the current collector in a variety of ways, either in superimposed layers, adjacent layers, or intermixed with each other, or as one material coating particles of the other material to form a mixture deposited on the current collector. However, a few criteria must be met when choosing electrode materials:

1. The anode and the cathode of the energy storage device preferably each possess both a high-rate material and a high-energy material. Obviously, if one of the electrodes is rate or energy limited, this electrode will gate the performance of the device.

2. The active electrochemical potential range of the high-energy and high-rate materials on a given electrode should overlap the entire desired operating range of that electrode. For example, if the electrode is to be operated between 0.5 and 1.0 V vs. Li, then the high-energy reaction (20) and the high-rate reaction (30) must overlap this range. This concept is qualitatively illustrated in FIG. 1, where the hypothetical capacities vs. potential for a high-rate and high energy material are shown. The redox window for the high-rate material should span the redox window of the high-energy material.

3. Both materials must have access to an electrolyte which can supply counter ions and complete the electrical circuit in the energy storage cell.

4. Chemical compatibility must be considered. For example, if the two materials share a common electrolyte, they both must be stable in that electrolyte.

The high-rate and high-energy materials are arranged on the same current collector such that they are in electrical contact. Examples of this arrangement are shown schematically in FIGS. 2–7 and include: dual sided, dispersed, layered, side-by-side, and coated powders. It should be noted that distinct phases of the different materials must exist, otherwise the performance of the electrode will be unpredictable. In FIG. 2, the high-energy material 42 is deposited on one side of the current collector 40, and the high-rate material 44 is deposited on the opposite side. In FIG. 3, the high-energy 42 and the high-rate 44 materials are co-mingled or mixed together and deposited as a single layer on one side of the current collector 40. FIG. 4 shows how the high-energy material 42 is first deposited on the current collector 40, then the high-rate material 44 is deposited in a layer on top of the high-energy material. Obviously, the order of deposition in this example could be reversed. FIG. 5 depicts both the high-rate and the high-energy materials 42 deposited in a single layer on one side of the electrode. In this example, the materials are layered in such a way that they are side by side in a single plane. Obvious variants of this are to interlace the two materials checkerboard style in squares or equivalent shapes such as circles or octagons, or to use alternating stripes of each material. FIG. 6 shows a powder consisting of the high-rate material 44 encapsulated within the high-energy material 42, then the powder is deposited on the current collector 40. Our use of the term 'encapsulated' should not be construed to mean completely sealing off the inner material from the environment by the outer coating material, but rather we mean to indicate that one material coats the other in such a way that both materials are exposed to the electrolyte solution. This is accomplished by making the outer coating porous to counter ions, or by making the outer coating incomplete, such that portions of the inner-most material are exposed to the electrolyte. FIG. 7 shows the same concept, expect that in this case the high-energy material 42 is encapsulated within the high-rate material 44. It should be noted that other similar arrangements can be envisioned which will fall within the scope and spirit of the invention and yield similar results.

Consider now our hybrid electrode composed of high-energy and high-rate materials disposed on a single current collector. Initially, both materials are fully charged and in equilibrium. If a high discharge demand pulse is passed through the electrode, the current will be supplied first by the high-rate material, since its reaction impedance is lower than the high-energy material. As the high-rate material is discharged, its electrochemical potential is lowered from the initial state. At the end of the demand pulse, the high-rate material potential is lower than the high-energy material. The high-energy material will then "recharge" the high-rate material until equipotential conditions are re-established in the electrode, so that the high-rate material can again supply the necessary current when the next high discharge demand pulse is required, and the process is repeated. Some specific examples of the invention are now presented.

EXAMPLE 1
Mixed Carbon Anodes

Carbon is used in commercially available double-layer capacitors and in battery anodes, with the carbon normally processed to optimize either rate capability or energy density, depending on the application. In the case of capacitors, energy is stored electrostatically and the peak power capability can be large. Typically, these carbons have surface areas greater than 100 $m^2/g$. The electrochemical reaction covers the entire potential window for the electrolyte used, therefore, this reaction will overlap with the high-energy reaction. For example, graphite intercalates lithium at a plateau between 0.5 and 0.1 Volts vs. metallic lithium; petroleum coke intercalates lithium over a slope running between >1 and 0.2 Volts vs. Li.

Different types of carbon such as graphite and petroleum coke are used in Li-ion batteries. Energy is stored by intercalating Li into the carbon to form $LiC_6$. While the energy density of these materials is large, the rate of Li intercalation limits the instantaneous power. Furthermore, the surface area of these carbons is too small (1 $m^2/g$) to provide appreciable charge from the double-layer capacitance. By mixing the "high-rate" and "high-energy" carbon together on the same electrode, high pulse power can be delivered by discharging the double-layer capacitance of the high-surface area carbon. During the interim between pulses, the $LiC_6$ high-energy material discharges and re-charges the high-rate material. Eventually, the "high-energy" material is completely discharged.

EXAMPLE 2
Li-intercalated Materials and n-type Conducting Polymers

The high-energy material is Li-intercalated into a material such as amorphous carbon. This reaction occurs in the range from 0.5 to 1.5 V vs. Li. The high-rate material in this case is an n-dopable conducting polymer such as polyfluorophenylthiophene (PFPT). The high-rate reaction of the PFPT involves a kinetically fast redox reaction in the potential range 0.5<E<1.5 V vs. Li. Again, the net result is fast discharge of the PFPT followed by recharge from the lithiated carbon. Other Li-intercalation materials which could be used as anodes include $Li_xWO_2$ (active range about 0.5 V to 1.5 V) and $Li_xMoO_2$ (about 0.8 V to 2.0 V).

EXAMPLE 3
Li-intercalated Materials and Carbon

This approach is similar to anode EXAMPLE 1. High-surface area carbon is used as the high-rate material and mixed with a material used in Li-ion batteries such as $LiCoO_2$.

EXAMPLE 3
Li-intercalated Materials and p-type Conducting Polymers

This approach is similar to EXAMPLE 2, however, the conducting polymer must be p-doped in this case. An example would be incorporation of polypyrrole with $LiCoO_2$. The reaction range for polypyrrole is about 2.7 to 4.3 V which sufficiently matches that of $LiCoO_2$.

EXAMPLE 4
Carbon and Conventional Anode

High surface area carbon can be combined with any of the well-known anodes used in aqueous systems including cadmium, metal hydride, lead, and zinc.

EXAMPLE 5
Ruthenium Oxide and Conventional Anodes

As in EXAMPLE 4, with $RuO_2$ replacing carbon.

EXAMPLES 6–9
Carbon and Conventional Cathodes

6. As above, but with high surface area carbon and conventional cathodes such as nickel, silver, air, and lead oxide.

7. As above, but with ruthenium oxide and conventional cathodes.

8. As above, but with AgO and carbon/air electrodes. Carbon/air electrodes rely on the reduction of oxygen as the cathode in systems such as Zn/air batteries. Manganese dioxide may optionally be used as a catalyst in conjunction with the carbon/air electrodes. Incorporation of AgO allows the kinetically fast Ag/AgO reaction to supplement the slow air reaction.

9. As above, but with cobalt oxide and nickel oxide. The nickel oxide reaction in conventional NiCd and NiMH cells is fairly slow relative to cobalt oxide. Again, the fast rate of the cobalt oxide provides high power while the nickel oxide provides the overall energy density.

The example systems can be broadly classified as non-aqueous and aqueous systems. The nonaqueous systems are based primarily on Li-ion. The aqueous may be acidic, neutral or basic. Both systems may use electrolytes which are solid, liquid, or gels and both systems may use conventional separators soaked with appropriate liquid electrolyte. All of the example materials are stable in the same non-aqueous electrolyte solvent systems which include one or more of the following: propylene carbonate, ethylene carbonate, dimethylcarbonate, diethylcarbonate, acetonitrile, esters, ethers, THF, etc. Liquid, gel, and polymer electrolyte systems are also well known and compatible with these materials. Li-ion batteries obviously require Li-salt electrolytes, while high-rate materials may use electrolyte salts based on Li or other cations (i.e. tetra-alkylammonium). It is possible to add multiple salts to the electrolyte to optimize performance. This will increase the conductivity and enhance the rate capability of the system. Aqueous electrolyte systems generally use acidic or basic electrolytes. While more than one ion may be present in the electrolyte (i.e. mixed ion electrolytes), there are obvious limitations as to the mixtures of ions, as the electrolyte cannot be acidic and basic at the same time.

The selected materials can be fabricated onto the same electrode using one of the schemes described above. It is important to note that the relative loadings of "high-rate" and "high-energy" material will have a significant effect in determining the ultimate performance of the energy storage device. If the application requires peak power for relatively long times, then the loading of the "high-rate" material should be increased. If pulse duration is relatively short or requires less current, the "high-rate" material loading may be decreased. This is analogous to the concept of using "larger" and "smaller" (respectively) capacitors.

Figure 8:
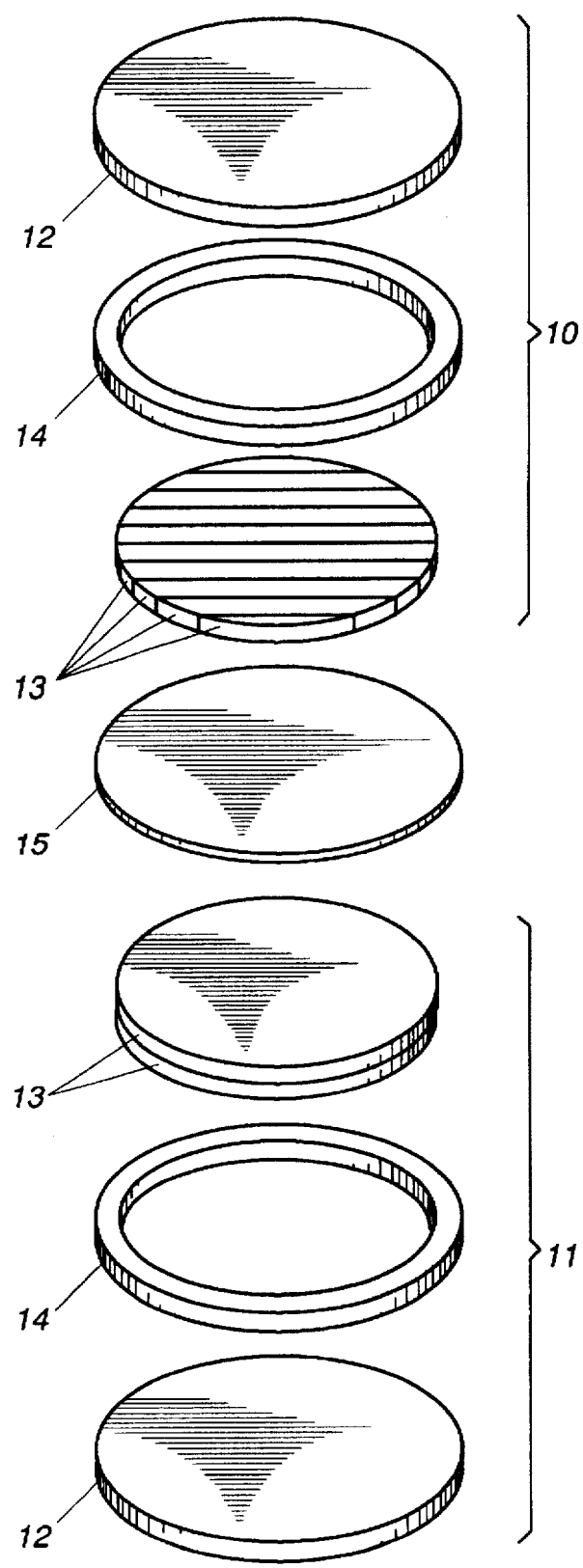
FIG. 8 is a schematic exploded-view representation of an electrical energy storage device in accordance with the invention.

FIG. 8 depicts one example of how an energy storage device in accordance with the invention is fabricated from a pair of electrode assemblies 10 and 11, which may be the anode and the cathode of the device. In the preferred embodiment, both of the electrode assemblies 10 and 11 are a hybrid electrode, as described above. However, it is also envisioned that an invention comprising a single hybrid electrode in conjunction with a conventional electrode would still fall within the scope and spirit of the invention. The hybrid electrodes 13 are deposited on current collectors 12 which are electrically conducting. The current collectors 12 are preferably chemically inert in the polymer electrolyte 15 described below. A housing or gasket 14 may be employed to house the electrode and the electrolyte, but is optional. The electrolyte 15 lies between the electrodes and may be in the form of a film, such as a polymer, which may also serve as a separator between the two electrodes. The combination electrolyte/separator prevents contact between the opposing electrodes since such a condition would result in a short circuit and malfunction of the electrochemical cell. Alternatively, it may be a conventional aqueous electrolyte employing acids or bases as described above, in which case an additional separator (not shown) is needed to keep the two electrodes from shorting together. This structure thus affords free and unobstructed movement to the ions through the electrolyte. An alternative to this structure is to arrange the package according to one of the many known schemes such as jelly roll, folding, stacking, etc.

In summary, our hybrid electrode for a high power, high energy, electrical storage device provides both high-energy and high-rate capability in a single electrode. By co-depositing the two materials on a single current collector, the volumetric size of the electrode, and thus the size of an energy storage device made using the electrode, is significantly reduced. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A hybrid electrode for a high power, high energy, electrical storage device, said hybrid electrode comprising:
    a current collector;
    a first electroactive material; and
    a second electroactive material,
    wherein:
        the first electroactive material has a higher energy density than the second electroactive material;
        the second electroactive material has a higher rate capability than the first electroactive material; and
        one of the first and second electroactive materials is formed as a first discrete layer in contact with the current collector, and the other of the first and second electroactive materials is formed as a second discrete layer deposited onto the first discrete layer.

2. The hybrid electrode as described in claim 1, wherein the hybrid electrode comprises an anode of the electrical storage device, and the first electroactive material is selected from the group consisting of cadmium, metal hydrides, lead, and zinc.

3. The hybrid electrode as described in claim 1, wherein the hybrid electrode comprises a cathode of the electrical storage device, and the first electroactive material is selected from the group consisting of nickel oxide, lead oxide, and silver.

4. The hybrid electrode as described in claim 1, wherein the second electroactive material is selected from the group consisting of high-surface area carbon, ruthenium oxide, silver oxide, cobalt oxide, and conducting polymers.

5. The hybrid electrode as described in claim 1, wherein the first electroactive material comprises one or more materials selected from the group consisting of La, Li, Na, Al, Fe, Zn, Cd, Pb, Sn, Bi, V, Mn, Co, Ni, Ag and their alloys, oxides, hydroxides, hydrides, carbides, nitride or sulfites, and carbon, polyaniline, polythiophene, polyfluorophenylthiopene, polypyrolle, n or p-doped polymers, redox polymers, and mixtures thereof.

6. The hybrid electrode as described in claim 1, wherein the second electroactive material comprises one or more materials selected from the group consisting of Nb, Hf Ti, Ta, Li, Fe, Zn, Sn, Ru, Ag, Pt, Ir, Pb, Mo, W, Ni, Co and their oxides, hydroxides, hydrides, carbides, nitride or sulfites, and carbon, polyaniline, polythiophene, polyfluorophenylthiopene, polypyrolle, n or p-doped polymers, redox polymers, and mixtures thereof.

7. The hybrid electrode as described in claim 1 wherein the electrical storage device comprises:

the hybrid electrode;

another electrode; and an electrolyte positioned between the hybrid electrode and the other electrode.

8. A hybrid electrode for an energy storage device, the hybrid electrode comprising:

a current collector;

a first electroactive material; and a second electroactive material, wherein:

the first electroactive material has a higher energy density than the second electroactive material;

the second electroactive material has a higher rate capability than the first electroactive material; and the second electroactive material is at least partially coated by the first electroactive material.

9. The hybrid electrode as described in claim 8, wherein the hybrid electrode comprises an anode of the electrical storage device, and the first electroactive material is selected from the group consisting of cadmium, metal hydrides, lead, and zinc.

10. The hybrid electrode as described in claim 8, wherein the hybrid electrode comprises a cathode of the electrical storage device, and the first electroactive material is selected from the group consisting of nickel oxide, lead oxide, and silver.

11. The hybrid electrode as described in claim 8, wherein the second electroactive material is selected from the group consisting of high-surface area carbon, ruthenium oxide, silver oxide, cobalt oxide, and conducting polymers.

12. The hybrid electrode of claim 8, wherein the first electroactive material comprises one or more materials selected from the group consisting of La, Li, Na, Al, Fe, Zn, Cd, Pb, Sn, Bi, V, Mn, Co, Ni, Ag and their alloys, oxides, hydroxides, hydrides, carbides, nitride or sulfites, and carbon, polyaniline, polythiophene, polyfluorophenylthiopene, polypyrolle, n or p-doped polymers, redox polymers, and mixtures thereof.

13. The hybrid electrode as described in claim 8, wherein the second electroactive material comprises one or more materials selected from the group consisting of Nb, Hf Ti, Ta, Li, Fe, Zn, Sn, Ru, Ag, Pt, Ir, Pb, Mo, W, Ni, Co and their oxides, hydroxides, hydrides, carbides, nitride or sulfites, and carbon, polyaniline, polythiophene, polyfluorophenylthiopene, polypyrolle, n or p-doped polymers, redox polymers, and mixtures thereof.

14. The hybrid electrode of claim 8, wherein the energy storage device comprises:

the hybrid electrode;

another electrode; and an electrolyte positioned between the hybrid electrode and the other electrode.

15. A hybrid electrode for an energy storage device, the hybrid electrode comprising:

a current collector having separate first and second regions located on a surface thereof;

a first electroactive material disposed on the first region of the current collector; and a second electroactive material disposed on the second region of the current collector, wherein the fist electroactive material has a higher energy density than the second electroactive material, and the second electroactive material has a higher rate capability than the first electroactive material.

16. The hybrid electrode of claim 15, wherein the first electroactive material comprises one or more materials selected from the group consisting of La, Li, Na, Al, Fe, Zn, Cd, Pb, Sn, Bi, V, Mn, Co, Ni, Ag and their alloys, oxides, hydroxides, hydrides, carbides, nitride or sulfites, and carbon, polyaniline, polythiophene, polyfluorophenylthiopene, polypyrolle, n or p-doped polymers, redox polymers, and mixtures thereof.

17. A hybrid electrode consisting of a first electroactive material comprising amorphous carbon intercalated with lithium, and a second electroactive material comprising polyfluorophenylthiopene, wherein the first electroactive material has a higher energy density than the second electroactive material, and wherein the second electroactive material has a higher rate capability than the first electroactive material.

18. The hybrid electrode of claim 15, wherein the second electroactive material comprises one or more materials selected from the group consisting of Nb, Hf Ti, Ta, Li, Fe, Zn, Sn, Ru, Ag, Pt, Ir, Pb, Mo, W, Ni, Co and their oxides, hydroxides, hydrides, carbides, nitride or sulfites, and carbon, polyaniline, polythiophene, polyfluorophenylthiopene, polypyrolle, n or p-doped polymers, redox polymers, and mixtures thereof.

* * * * *